A. BLACKWOOD.
Lock-Strike.

No. 213,967. Patented April 8, 1879.

Witnesses.
S. N. Piper
W. W. Lund

Inventor.
Alexander Blackwood,
by attorney.
R. H. Eddy

UNITED STATES PATENT OFFICE.

ALEXANDER BLACKWOOD, OF BOSTON, MASSACHUSETTS.

IMPROVEMENT IN LOCK-STRIKES.

Specification forming part of Letters Patent No. 213,967, dated April 8, 1879; application filed February 26, 1879.

*To all whom it may concern:*

Be it known that I, ALEXANDER BLACKWOOD, of Boston, of the county of Suffolk and State of Massachusetts, have invented a new and useful Improvement in Catch-Plates for Spring-Bolts of Door-Locks; and do hereby declare the same to be described in the following specification and represented in the accompanying drawings, of which—

Figure 1:
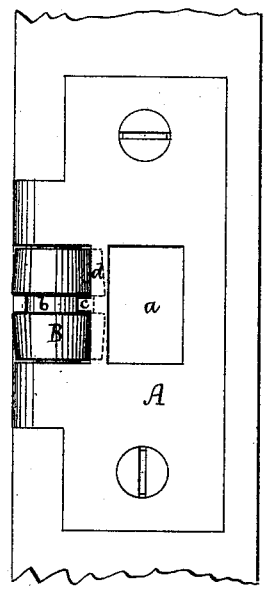
Figure 2:
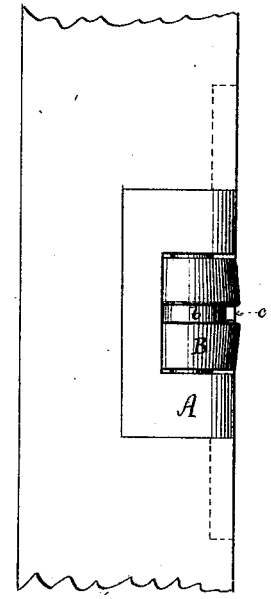
Figure 3:
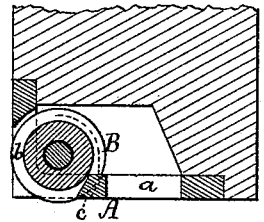

Figure 1 is a front view, Fig. 2 an end elevation, and Fig. 3 a transverse section, of a catch-plate provided with my invention, which is an improvement with reference to a catch-plate having a friction-roller to aid the spring-bolt of a lock in its passage to the recess or catch-hole of the plate.

In carrying out my said invention, I make the friction-roller with a groove extending around it at or near its middle, and I provide the catch-plate with a bridge or projection to enter such groove, all being substantially as represented in the drawings, in which—

Figure 4:
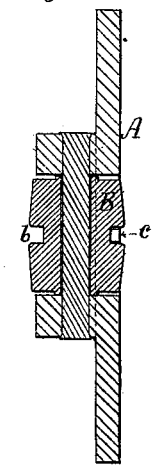

A denotes the catch-plate; B, the friction-roller; $a$, the bolt-receiving opening; $b$, the groove of the roller, and $c$ the bridge or projection extending into such groove. Furthermore, the roller from the groove to each end is tapering, or, in other words, a conic frustum, such being more particularly exhibited in Fig. 4, which is a vertical section of the roller, its supporting-spindle, and the part of the catch-plate in which the roller is arranged.

The projection $c$ so bridges over the cavity between the roller and the inner side of the recess $d$, in which the roller is placed, as to prevent the angular end of the lock-bolt from catching in such cavity in passing from the roller to the opening $a$. Furthermore, by having the roller tapering in opposite directions from the groove, as shown, the bolt in passing across the roller comes in contact with it only near the groove, and as a consequence moves on the roller with less friction than would be the case were the roller cylindrical.

I claim as my improvement on the lock-bolt catch-plate provided with the friction-roller as follows, viz:

1. The roller, grooved as described, in combination with the catch-plate having the bridge or projection to enter the groove, such groove and projection being arranged as and for the purpose specified.

2. The roller, grooved and tapering as described, in combination with the catch-plate having the bridge or projection extending from it into the groove, all being essentially as set forth.

ALEXANDER BLACKWOOD.

Witnesses:
R. H. EDDY,
W. W. LUNT.